E. PONS.
ELECTRIC WINDING MECHANISM FOR CLOCKS AND THE LIKE.
APPLICATION FILED JULY 25, 1912. RENEWED SEPT. 30, 1918.
1,301,499.  
Patented Apr. 22, 1919.
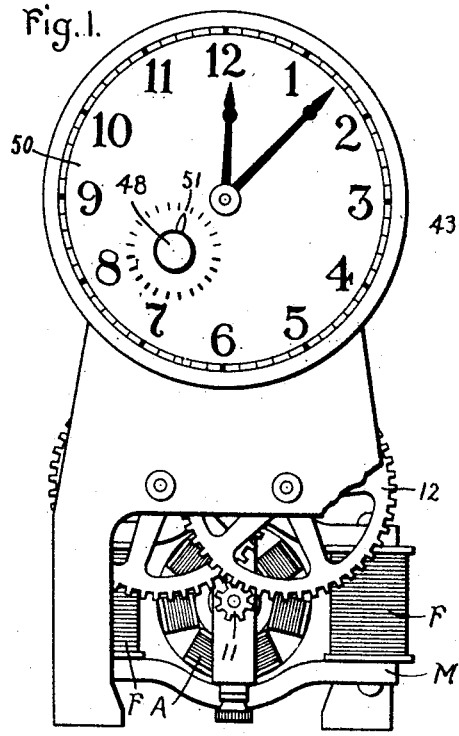
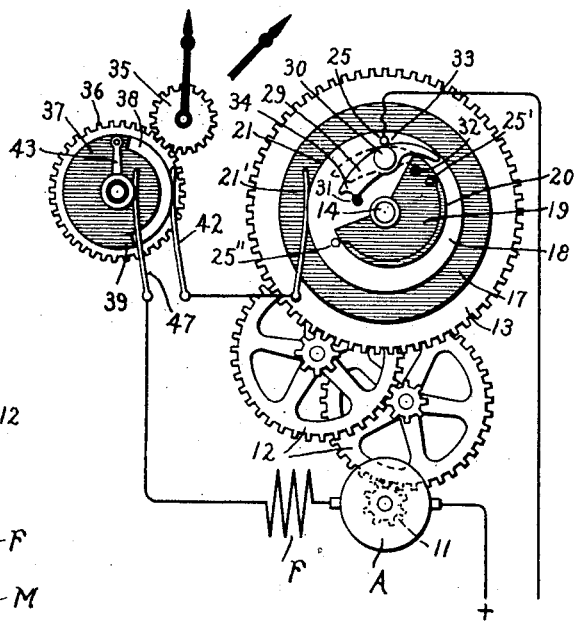
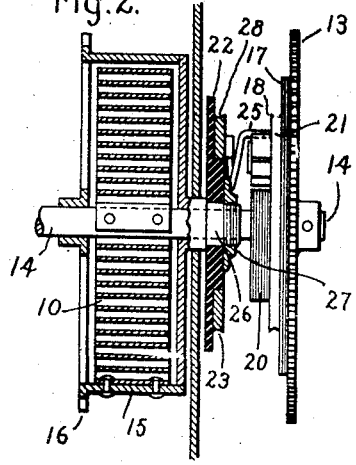
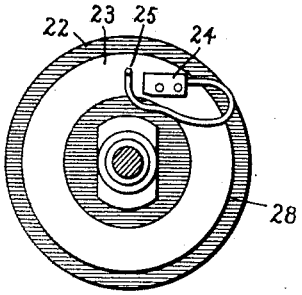
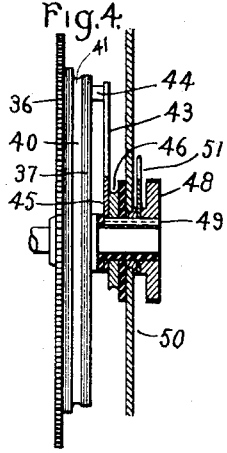
Witnesses  
J. Ellis Eler  
Anthony E. Marx
Inventor  
Eugene Pons  
by Frank Seabolt  
Atty.

UNITED STATES PATENT OFFICE.

EUGENE PONS, OF SCHENECTADY, NEW YORK, ASSIGNOR OF FIFTEEN THIRTY-SECONDS TO FRANK J. SEABOLT, ONE-FOURTH TO MABEL H. HALL, AND ONE THIRTY-SECOND TO CHARLES D. KNIGHT, ALL OF SCHENECTADY, NEW YORK, AND ONE-FOURTH TO EDWARD F. PICKFORD, OF WASHINGTON, DISTRICT OF COLUMBIA.

ELECTRIC WINDING MECHANISM FOR CLOCKS AND THE LIKE.

1,301,499.     Specification of Letters Patent.     Patented Apr. 22, 1919.

Application filed July 25, 1912, Serial No. 711,444. Renewed September 30, 1918. Serial No. 256,349.

*To all whom it may concern:*

Be it known that I, EUGENE PONS, a citizen of the French Republic, residing at Schenectady, in the county of Schenectady, State of New York, have invented certain new and useful Improvements in Electric Winding Mechanism for Clocks and the like, of which the following is a specification.

This invention relates to the winding of spring motor mechanism by means of an electric current and has for its object the provision of means whereby an electromagnetic device, such as an electric motor, is periodically energized to wind up the spring after it has run down a predetermined amount, the circuit of the motor being also under the control of a switch which is independent of the spring mechanism.

While my invention is capable of wide application in spring motor mechanism, it is particularly applicable to clock mechanisms which are automatically wound on an electric circuit. One of the chief applications of my invention is found in clock mechanisms which are automatically wound by means of an electric light or power circuit although my invention is in no sense limited to such a circuit as distinguished from a storage battery or primary battery circuit.

In illustrating my invention I have selected an electric clock winding mechanism such as is described and claimed in the patents of George H. Rupley, Nos. 832,747 and 897,020. Broadly stated, the invention covered by these patents consists of a clock mechanism or the like which is arranged to be automatically wound and rewound as the spring runs down, provision being made whereby the spring continues to run down for an interval when the motor circuit is closed in case that for any reason there is no current available for operating the motor when it becomes time to wind. In the Patent, No. 897,020, the means for controlling the motor circuit consists of two contacting members which open and close the motor circuit as they are moved with relation to each other, one of the members being driven by the motor as it winds the spring while the other is driven by the spring.

Although this arrangement is in general entirely satisfactory, in some cases it is desirable to control the time at which the clock will wind. While it is possible to so arrange the contacting mechanism that the clock will wind at very nearly equal intervals of time, the winding times may become shifted due to turning of the hands and other causes inherent in clock mechanisms so that winding occurs at inconvenient times. For instance, if the clock were located in a sleeping chamber it would be annoying to have it wind up in the middle of the night. One of the objects of my invention is to overcome this difficulty by providing means whereby the winding is controlled by the hands of the clock in addition to being controlled by the spring mechanism. I also provide means whereby the time at which the winding occurs may be adjusted at will.

Another object of my invention is to provide improved means whereby the contact members may revolve more than one revolution with reference to each other while in conducting relation before the clock mechanism is stopped. Other objects and purposes of my invention will appear in the course of the following specification in which I have shown my invention embodied in concrete form for purposes of illustration.

In the accompanying drawing illustrating one form of my invention, Figure 1 is a front view of a complete device, certain portions being broken away; Fig. 2 is a section showing the drum and the contact mechanism; Fig. 3 is a front view of one of the contacting members; Fig. 4 is an end view partly in section of the contact device controlled by the hands; and Fig. 5 is a diagrammatic view showing the circuit connections.

Referring first to Figs. 1, 2 and 5, it will be seen that I have provided an electric motor M, having an armature A and a series field F which winds the spring 10 of the clock by means of a pinion 11 and gearing 12 which drive the main gear 13 secured to the shaft 14. The spring has its inner end secured to the shaft 14 while the outer end is secured to the drum 15 in the well-known manner. The rotation of the motor, therefore, will rotate the shaft 14 and wind up the spring 10. As the clock runs down the drum will, of course, rotate and transmit its power to the clock mechanism through the gear 16. In order to control the motor circuit so that when the spring runs down the motor circuit will be closed and when it is properly wound up the motor circuit will be opened, I provide two contact members, one of which is driven by the shaft 14 and the other by the drum 15. One of these members is secured to the gear 13, as shown in Figs. 2 and 5, and consists of a flat disk 17 of insulating material upon which is mounted the disk 18 of metal, such as brass. This disk 18 is cut away at its central portion to receive the plate 19 of insulating material. This plate is segmental in shape and is provided at its outer edge, where it joins the metal disk, with a rib or flange 20. The segmental plate is so arranged with reference to the disk and the shaft 14 that the rib 20 is eccentric with reference to the shaft. The main body of the plate is flush with the surface of the metallic disk and the rib does not extend all the way around the edge of the segment but leaves portions at the ends of the rib at which the conducting and insulating surfaces are flush. The edge of the disk 18 is grooved at 21 to receive the current carrying brush 21'. The other conducting member consists of a disk of insulating material 22 upon which is mounted a metallic ring 23 to which is secured the spring contact or contactor. This spring contact is bent in the form of a loop as shown and has one end secured to the ring by a metallic block 24 while the contacting end is bent outward at right angles to the ring so as to form a brush 25 which engages the surfaces of the disk 18 or plate 19 depending upon the relative position of the contacting members. The insulating disk 22 is secured to the drum 14 by means of a projecting hub 26 on the drum which passes through the center of the disk and is secured thereto by a nut 27. The outer edge of the ring 23 is grooved at 28 to receive a current carrying brush (not shown).

When the two contacting members are assembled as shown in Fig. 2 the contacting end 25 of the spring contact projects over into engagement with the flat surfaces of the other contacting member and is yieldingly held in contact therewith. The brush 25 is likewise adjacent the rib 20 so that it will be deflected by the rib as the contacting members rotate with reference to each other. By referring to Fig. 5 the operation of the two contacting members will be clearly understood. Assuming that the brush 25 is in the position shown in full lines at 25' in Fig. 5 and the spring is wound up, as the spring runs down the brush will be carried around on the inside of the rib by the rotation of the drum, and since the rib is eccentric, the brush will be placed under tension. When the brush reaches the end of the rib it will snap over to the position 25'' in which it engages the conducting surface. If the motor now operates it will rotate the gear 13 which will rotate the shaft 14 to wind the spring and will turn the rib in the same direction in which the brush was rotated, thereby causing the brush to slide around the outside of the rib and be placed under tension as before until it snaps over the end of the rib to its original position and opens the motor circuit. The spring has thus been wound up exactly the amount it has run down. If, however, when the brush snaps over to conducting position 25'' there is no current or the motor circuit is open at another point (as hereinafter described) then the brush will continue to rotate around the disk. In order to enable the brush to rotate in contact with the disk for more than one revolution so as to give a long period during which the spring may at any time be wound if current is supplied and at the same time positively stop the clock after a predetermined movement, I provide the stop element 29. This element is curved as shown and pivoted at 30 so as to move from the full line position against the stop 31 to the dotted line position against the stop 32. It will be obvious that with the stop element 29 in the position shown in full lines, as the brush rotates around in a clockwise direction in engagement with the disk it will engage the stop at about the point 33 and further rotation will move the stop to the position shown in dotted lines. The brush will continue to travel around on the disk if the motor does not start until it finally engages the curved end 34 of the stop (which is now in the dotted position). It is understood, of course, that the stop is so arranged by friction or otherwise that it will remain in any position to which it is moved. Since a considerable pressure will be exerted between the brush and stop in order to hold the spring and stop the clock I have provided the block 24 against which the brush end of the spring contact will be moved so as to transmit the pressure directly to the ring 23 and relieve the spring contact which might otherwise be thrown out of adjustment. When the motor is energized, the brush 25 will remain substantially stationary, but the other member will rotate as before in a clockwise direction, the brush sliding around the outside of the rib. When it reaches the end of the rib it will not snap off as before but will ride over the tail of the element 29. When the brush passes the pivotal point of the element 29 it will move it back to the full line position against the stop 31 and continue on around until it finally snaps off the end of the rib, since the tail of the element 29 no longer prevents it from doing so. The clock spring is thus wound up exactly the amount it had run down.

With this arrangement the clock will wind and rewind at intervals (assuming that the motor always operates when the end of the rib is reached) which will be approximately equal and the length of the intervals will depend upon the length of the insulating rib, the gearing, etc. By proper arrangement and adjustment of the parts, the winding can be caused to take place approximately every twelve hours or every twenty-four hours but the time of winding will not, of course, bear any relation to the actual time of day as indicated by the hands. In order that the winding shall occur at any desired time of day and occur every day at the same time I have provided another switch independent of the contacting mechanism which must be closed before the motor is energized. This switch is controlled by the position of the hands of the clock and is shown in Figs. 4 and 5. Although I refer to this switch as being controlled by the hands, it is really driven by only one hand,—the hour hand—which of course is moved proportionately to the minute hand. The arrangement whereby this is accomplished is shown in Fig. 5 and in detail in Fig. 4. The hour hand is provided with a gear 35 which rotates with the hand. This gear meshes with a larger gear 36 which carries an insulating disk 37 having the outer edge cut away for a portion of the circumference and a conducting segmental ring 38 substituted for the cut-away material. This ring 38 is set a little below the surface of the insulating disk so that the brush which engages it will move from the insulating surface to the conducting surface with a snap action. At the opposite end 39 of the conducting ring, the insulating material is tapered so that the brush can slide easily from the conducting to the insulating surface. It will be understood, of course, that the current is never broken on these contacts as their movement is very slow and it takes but a few seconds for the motor to wind the spring and break the circuit at the insulating rib of the other contact mechanism. In the actual construction of this contact device a circular disk 40 having a groove 41 on its edge for receiving the brush 42 is secured to the gear 36 and the insulating disk 37 having the same diameter as the disk 40 is mounted over the disk 40 leaving the conducting ring 38 which is a portion of disk 40 uncovered. The brush 43 consists of a spring finger having a hub 44 on its end and a hub 45 provided with a groove 46 for the brush 47. This brush 43 is turned by means of a knurled head 48 which is caused to rotate with the brush by a pin or key 49 extending through the dial 50 of the clock. The brush and grooved hub, as well as the knurled head, are insulated from the parts of the clock as shown. A pointer 51 is secured to the knurled head and the clock dial is graduated as shown in Fig. 1 to indicate twenty-four hours. The gear 36 has preferably twice as many teeth as the gear 35 so that while the hour hand is making two revolutions the gear 36 and contact surfaces associated therewith make only one. By shifting the brush 43 by means of the knurled head, the hour at which contact will be made between the brush 43 and the conducting surface may be set at will, thereby setting the hour at which the clock will wind.

As thus constructed and arranged the operation of my device will be as follows: As the clock runs down the brush 25 travels around the inside of the rib 20 until it snaps off the end as heretofore described. It not being the hour to wind the brush continues on around the conducting surface. Assuming, for example, that it takes fifteen hours for the brush to travel the length of the rib, it will then travel on for nine hours more when it will be about in the position shown, in engagement with the element 29. Since twenty-four hours have now passed since the last winding, the brush 43 makes contact and completes a circuit through the motor from the positive side of the line through the armature A, field F, brush 47, brush 43, conducting ring 38, brush 42, brush 21', thence to the brush 25 and back to the negative side of the line. The motor being now energized the spring will be wound up quickly and the motor circuit will be opened at the end of the rib 20, as before described. This rib 20 is made long enough so that it takes the brush 25 longer to travel over it before the circuit is closed than it takes the brush 43 to travel over its conducting surface, otherwise the clock would wind as soon as the brush 25 snapped on to the conducting surface instead of at the end of twenty-four hours. The ring 38 is made elongated so that in case there is no current at the time for which the clock is set to wind, the circuit will remain closed for several hours during which if current returns to the line the clock will wind. In this case, of course, the clock would not be wound at the time set but the failure of current at this particular time would occur very rarely and in fact the time for winding will be set at an hour when the current it not supposed to be off.

It will thus be seen that the clock will wind at a predetermined hour every day unless the power should be off at that time in which case the clock will wind as soon as the power comes on. It will be understood, of course, that my invention is not limited in its application to a spring clock nor in fact is it limited to a clock mechanism at all, since it is equally applicable to spring motor mechanisms the winding of which is controlled independently of the spring mechanism. While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. The combination with a clock mechanism, of an electromagnetic device for winding the same, and means whereby the winding device operates periodically at a predetermined time as indicated by the hands of the clock to restore in the mechanism the energy which has been expended since the last winding operation.

2. The combination with a clock mechanism, of means for winding the same comprising an electromagnetic device, and means whereby the circuit of said electromagnetic device is closed to wind the mechanism when the hands of the clock reach a predetermined position and opened to stop the winding operation when the mechanism has been wound up the amount which it has run down since the last winding operation.

3. The combination with a clock mechanism, of an electromagnetic device for winding the same, a switch controlled by the hands of the clock, contacts in the circuit of the electromagnetic device which close when the mechanism runs down a predetermined amount and remain closed as the mechanism runs down further until the hands reach a predetermined position whereupon the mechanism is wound up the amount it has run down since the last winding and the circuit opened at the contacts.

4. The combination with a clock mechanism, of an electromagnetic device for winding the same, a switch which closes at a predetermined position of the hands of the clock and remains closed during a further movement of the hands, contacts in the circuit of the electromagnetic device which close when the mechanism runs down a predetermined amount and remain closed as the mechanism runs down further until the hands reach said predetermined position, whereupon the mechanism is wound up the amount it has run down since the last winding and the circuit opened at the contacts.

5. The combination with a clock mechanism, of an electromagnetic device for winding the same, means whereby the winding device operates periodically at a predetermined time as indicated by the hands of the clock to restore in the mechanism the energy which has been expended since the last winding operation, and means for changing the time at which the winding operation takes place.

6. The combination with a clock mechanism, of an electromagnetic device for winding the same, a switch controlled by the hands of the clock, contacts in the circuit of the electromagnetic device which close when the mechanism runs down a predetermined amount and remain closed as the mechanism runs down further until the hands reach a predetermined position, whereupon the mechanism is wound up the amount it has run down since the last winding and the circuit opened at the contacts, and means for varying the position of the hands at which the winding operation occurs.

7. The combination with a clock mechanism or the like, of means for winding the same comprising an electric motor, a controlling device for the motor circuit controlled by the spring mechanism of the clock, and a switch governed by the position of the hands of the clock for controlling the circuit through the motor and controlling device.

8. The combination with a clock mechanism or the like, of means for winding the same comprising an electric motor, a controlling device for the motor circuit which is closed when the spring runs down a predetermined amount and opened when the spring is wound up, and a switch governed by the position of the hands of the clock for controlling the circuit through the motor and controlling device.

9. The combination with a clock mechanism or the like, of means for winding the same comprising an electric motor, a controlling device for the motor circuit which is closed when the spring runs down a predetermined amount and opened when the spring is wound up, means whereby the spring continues to run down after the controlling device is closed with said device in closed position, and a switch governed by the position of the hands of the clock for controlling the circuit through the motor and controlling device.

10. The combination with a clock mechanism or the like, of means for winding the same comprising an electric motor, a controlling device for the motor circuit which is closed when the spring runs down a predetermined amount and opened when the spring is wound up, and a switch controlling the circuit through the motor and controlling device arranged to be closed in certain positions of the hands of the clock and open in certain other positions.

11. The combination with a clock mechanism or the like, of means for winding the same comprising an electric motor, a controlling device for the motor circuit which is closed when the spring runs down a predetermined amount and opened when the spring is wound up, means whereby the spring continues to run down after the controlling device has closed with said device in closed position, a switch for controlling the circuit through the motor and controlling device, and means whereby said switch closes when the hands have reached a predetermined position and remains closed during a predetermined movement thereof.

12. The combination with a clock mechanism or the like, of means for winding the same comprising an electric motor, a controlling device for the motor circuit which is closed when the spring runs down a predetermined amount and opened when the spring is wound up, a switch controlling the circuit through the motor and controlling device arranged to be closed when the hands reach a predetermined position, and means for changing the position at which the switch closes.

13. The combination with a clock mechanism or the like, of means for winding the same comprising an electric motor, a controlling device for the motor circuit which is closed when the spring runs down a predetermined amount and opened when the spring is wound up, means whereby the spring continues to run down after the members have moved to closed position with the said members in closed position, a switch controlling the circuit through the motor and controlling device arranged to be closed when the hands reach a predetermined position, and means for changing the position at which the switch closes.

14. The combination with a clock mechanism or the like, of means for winding the same comprising an electric motor, a controlling device for the motor circuit which is closed when the spring runs down a predetermined amount and opened when the spring is wound up, means whereby the spring continues to run down after the members have moved to closed position with the said members in closed position, a switch which controls the circuit through the motor and controlling device arranged to be closed when the hands reach a predetermined position and remain closed during a predetermined movement of the hands, and means for changing the position at which the switch closes.

15. The combination with a spring motor mechanism of means for winding the same comprising an electric motor, a controlling device for the motor circuit which is closed as the spring runs down and opens when the spring is wound up, means whereby the spring continues to run down after the controlling device is closed, with said device in closed position, and a switch closed automatically after the closing of said device for completing the circuit through the motor and the controlling device so that the electric motor will operate only when the controlling device and switch are in closed position.

16. The combination with a spring motor mechanism of means for winding the same comprising an electric motor, a controlling device for the motor circuit consisting of contacting members which move to closed position as the spring runs down, one of said members being driven by the motor in winding the spring and the other by the spring, means whereby the spring continues to run down with said members in closed position and a switch operated automatically after the closing of the contacting members to complete the circuit through the motor and said members so that the electric motor will only operate when the switch and contacting members are in closed position.

17. The combination with a clock mechanism, of winding mechanism therefor including an electric motor and means for periodically controlling the motor circuit said means comprising a rotary contact having a conducting and an insulating surface, a rotary contactor engaging the same, means whereby said contactor is automatically shifted from one surface to the other as the spring runs down and winds up respectively, and an element associated with said contact arranged to be moved by said contactor into a position to stop the movement of said contactor upon a succeeding revolution.

18. The combination with a clock mechanism, of winding mechanism therefor including an electric motor and means for periodically controlling the motor circuit said means comprising a rotary contact having a conducting and an insulating surface, a rotary contactor engaging the same, means whereby said contactor is automatically shifted from one surface to the other as the spring runs down and winds up respectively, and an element associated with said contact arranged to be moved by said contactor into and out of position and stop the said contactor.

19. The combination with a clock mechanism, of winding mechanism therefor including an electric motor and means for periodically controlling the motor circuit said means comprising a rotary contact having a conducting and an insulating surface, a rotary contactor engaging the same, means whereby said contactor is automatically shifted from one surface to the other as the spring runs down and winds up respectively, and an element associated with said contactor and arranged to be moved by said contact into a position to stop the said motor on a succeeding revolution and be moved out of stopping position by a revolution of the contact.

20. The combination with a clock mechanism, of winding mechanism therefor including an electric motor and means for periodically controlling the motor circuit said means comprising a rotary contact having a conducting and an insulating surface, a rotary contactor engaging the same, means whereby said contactor is automatically shifted from one surface to the other as the spring runs down and winds up respectively, and an element associated with said contact arranged to be moved by said contactor into a position to stop the movement of said contactor upon a succeeding revolution.

21. The combination with a clock mechanism, of winding mechanism therefor including an electric motor and means for periodically controlling the motor circuit said means comprising a rotary contact having a conducting and an insulating surface, a rotary contactor engaging the same, means whereby said contactor is automatically shifted from one surface to the other as the spring runs down and winds up respectively, and an element associated with said contact arranged to be moved by said contactor into and out of position and stop the said contactor.

22. The combination with a clock mechanism, of winding mechanism therefor including an electric motor and means for periodically controlling the motor circuit said means comprising a rotary contact having a conducting and an insulating surface, a rotary contactor engaging the same, means whereby said contactor is automatically shifted from one surface to the other as the spring runs down and winds up respectively, and an element associated with said contactor and arranged to be moved by said contact into a position to stop the said motor on a succeeding revolution and be moved out of stopping position by a revolution of the contact.

In witness whereof, I have hereunto set my hand this 22nd day of July, 1912.

EUGENE PONS.

Witnesses:
F. J. SEABOLT,
ESTHER H. MYERS.

Copies of this patent may be obtained for five cents each, by addressing the "Commissioner of Patents, Washington, D. C."